Feb. 4, 1964

D. H. IMHOFF ET AL 3,120,470

METHOD OF PRODUCING NEUTRONS

Filed April 13, 1954

INVENTORS
Donald H. Imhoff
Wesley H. Harker

By
ATTORNEYS

Feb. 4, 1964  D. H. IMHOFF ET AL  3,120,470
METHOD OF PRODUCING NEUTRONS
Filed April 13, 1954

INVENTORS
Donald H. Imhoff
Wesley H. Harker
By
ATTORNEYS

United States Patent Office

3,120,470
Patented Feb. 4, 1964

3,120,470
METHOD OF PRODUCING NEUTRONS
Donald H. Imhoff, Walnut Creek, and Wesley H. Harker, Livermore, Calif., assignors, by mesne assignments, to the United States of America as represented by the United States Atomic Energy Commission
Filed Apr. 13, 1954, Ser. No. 422,846
7 Claims. (Cl. 176—5)

This invention relates to methods for the production of intense fluxes of fast neutrons. Fast neutron fluxes of this type are useful for various well-known purposes.

This method of producing a controlled flux of fast neutrons may be characterized by the steps of injecting reactive particles such as deuterons and tritons, and neutralizing particles such as electrons into a reaction zone within a usually elongated and preferably axially symmetrical, terminally concentrated magnetic field and imposing an oscillating transverse electrical field upon said reactive particles to impart a rotational component thereto and to confine the paths of said particles within said reaction zone.

It is an object of this invention to provide methods for controlling the paths of charged particles of deuterium and tritium in a magnetically confined reaction zone.

Another object is to provide methods for effecting of a neutron-producing reaction by confining charged particles of deuterium and tritium within complementary electric and magnetic fields.

Another object is to provide a method wherein operating hazards in neutron-producing reactions may be minimized by maintaining the reaction zone at an energy level that will yield a negative temperature coefficient for said reaction.

Another object is to provide a method of maintaining a nuclear reaction continuously to produce energy in the form of fast neutrons.

These and other objects and advantages will be further apparent from the following description and the attached drawing which illustrates diagrammatically several alternative embodiments of the invention.

A primary requirement in controlling the travel of the several particles within the confining magnetic field is the maintenance of a sufficiently high ratio of rotational energy ($E_r$) to translational energy ($E_z$) to produce a particle-reflecting action between magnetic mirrors or reflectors at the ends of the reaction zone. The transverse accelerating electrical fields, which may take a variety of forms, act to impart this rotational energy and thereby to maintain this ratio at a desirable level.

During the passage of the particles throughout the reaction zone, they are scattered by collisions with other reactive particles so that the ratio of rotational to translational energy tends to decrease with time. In addition to energy transfers between the heavy reacting particles due to collisions with each other, energy is constantly lost from the particles by collisions with electrons. The electrons themselves give up their energy primarily by radiation processes. Since the rate of energy loss from the electrons is proportional to their total energy while the rate of transfer of energy from the positive particles is substantially proportional to the difference between the energies of those particles and the electrons, the net result is that the average energy of the positive particles will be higher than that of the electrons. As these interactions occur, the deutrons and tritons, which may have been originally injected at substantially the same energy level as the electrons, give up a part of their energy to those electrons which have been degraded in energy by the radiation processes just mentioned.

The addition of the rotational component by the oscillating electrical fields adds energy to the system at a point where its utility is greatest; i.e., to maintain the required ratio of rotational ($E_r$) to translational ($E_z$) energy at a desired value. If this ratio is equal to or greater than the quantity $$\frac{H_0}{H - H_0}$$

where $H_0$ and $H$ are the magnetic field strengths expressed in gausses in the central section and the terminally concentrated sections, respectively, of the magnetic field, the particles will be reflected from the magnetic mirrors which are created by the concentrated fields at the ends of the reaction zone and hence will be confined within the system.

Heretofore, the proposed thermonuclear reaction systems which may be described as controlled, as distinguished from the present system which is driven, were dependent upon the energy release of the reaction to maintain the energy level of the system at a point where the thermonuclear reaction could be sustained. In a controlled reaction of that type, it is necessary that the internal energy generation of the reacting particles be high enough to exceed the loss of energy from the system by electron radiations and other processes; e.g., diffusion of particles out of the reaction zone. In general, this condition requires a very great energy content per unit volume of particles. Under these conditions, if the internal energy generation rate rises even slightly above that necessary to maintain the system in a steady state, the reaction may become unstable and destructive.

This invention, however, drives the reaction independently of energy loss by (1) maintaining the energy levels of the system at the desired value by adjusting the energy of the injected particles and (2) adding energy to the system by means of the oscillating electrical fields.

One example of an arrangement for confining the several particles (deuterons, tritons and electrons) under such conditions that they will react by fusion to produce primarily an intense flux of fast neutrons, is an axially symmetrical and preferably elongated magnetic field with localized high intensity magnetic fields at each end of the reaction zone to produce what may be designed magnetic reflectors or mirrors, or, more simply, a longitudinally asymmetrical or varying magnetic field. Ionized particles of deuterium and tritium and a supply of electrons are created at suitable energy levels; for example, 20 to 50 kev., by appropriate ion generators and accelerators known in this art. The particles of opposite polarity are injected axially into opposite ends of the magnetic system described above and are initially deflected therein by imposing oscillating electric fields in accordance with this invention to produce a helical motion at the required ratio of rotational to translational energy $$\left(\frac{E_r}{E_z}\right)$$

greater than about 0.5 to obtain the desired particle confinement.

The transverse oscillating electric fields at the ends of the reaction zone may be considered as subdivided into an injection field and a reflection-enhancing field. The injection field would normally be placed across the most highly concentrated magnetic field and would act to impart an initial rotation to the injected particles entering along the axis of the magnetic field. The reflection-enhancing field, on the other hand, is desirably placed in a zone of the magnetic gradient between the uniform magnetic field $H_0$ surrounding the main part of the reaction zone and the concentrated magnetic field $H$ at the extreme end of said zone. These transverse electric fields may be of different frequencies and potentials to obtain the desired effect of permitting the charged particles to be introduced into the reaction zone and then to cause them to be reflected backwardly and forwardly between the magnetic mirrors at the ends of said zone. In addition, the frequency of excitation of the fields must be chosen so that there will be present resonant frequencies for both the tritons and deuterons. The mass of the neutralizing electrons is such that it is usually not feasible to impose a field which will selectively impart a rotational component to those particles.

The net effect of the uniform and concentrated magnetic fields and the transverse reflection-enhancing electric fields is to produce multiple reflections and to direct each particle along a confined path of a generally helical nature within the reaction zone so that it may produce fast neutrons. The particles will travel at different rates and in different orbits due to their differing masses, energies, and degree of randomization, which will increase the number of nuclear events and raise the efficiency of the system for the production of fast neutrons.

Figure 1:
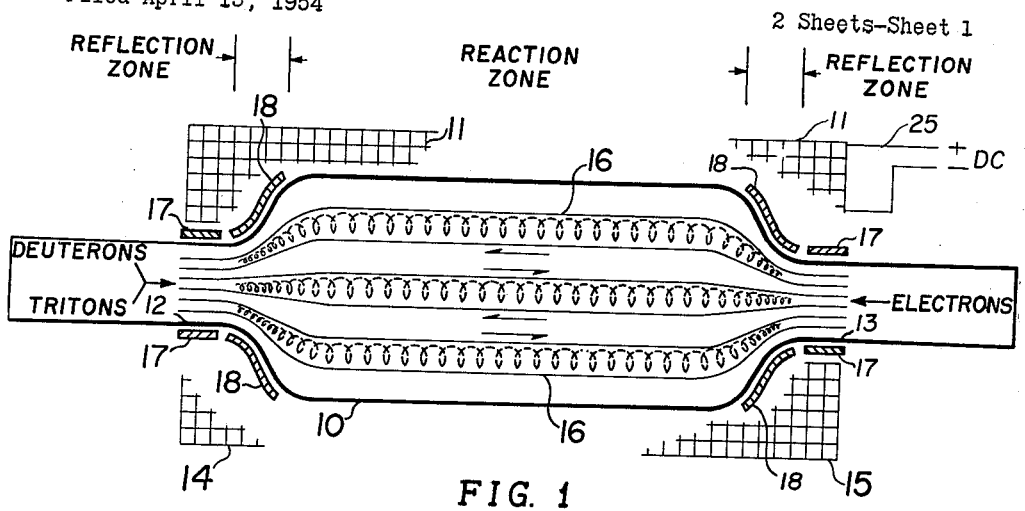
FIGURE 1 is a diagrammatic longitudinal sectional view illustrating the principle of this invention and a preferred mode for carrying it out.

Referring to FIGURE 1 of the drawings, there is illustrated generally an evacuated reaction zone 10 formed within a vessel made of a refractory nonmagnetic material, preferably of low dielectric constant, and surrounded throughout its cylindrical portion by a winding 11 energized from a suitable direct current source 25 to give a substantially uniform elongated magnetic field $H_0$ throughout the zone. The ends 12 and 13 of zone 10 are desirably decreased in diameter, as shown, and a greater number of turns of the winding 11 are placed around these portions, as at 14 and 15, to give a higher intensity magnetic field H at both ends of the zone. Alternatively, these end portions could be separately energized to give a higher intensity field H. This arrangement may be characterized as providing an axially symmetrical, terminally concentrated magnetic field for reaction zone 10. The result of this arrangement will give a longitudinally varying internal magnetic field distribution within zone 10 substantially as represented by field lines 16, which are relatively far apart throughout the major portion of the zone and approach closely together at the ends thereof.

Figure 3:
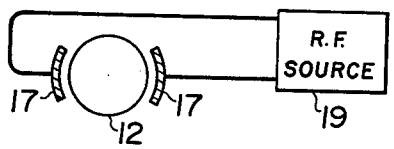
FIGURE 3 is a transverse sectional view on line III—III of the arrangement of FIGURE 2.

In this example, reactive charged particles of deuterons and tritons are illustrated as being introduced together into the restricted end portion 12 of zone 10 from any suitable type of ion injector. Desirably, these positively charged particles are injected axially into the zone with a predetermined energy content of about 20 to 50 kev. The space charge between the particles as they enter the zone and the forces between their charges and the diverging magnetic field lines, will impart some rotational energy to the particles in addition to the axial or translational energy with which they are introduced into the zone. In accordance with this invention, this rotational energy is enhanced to meet the critical $E_r/E_z$ ratio described above by providing a transverse electric field between opposed sets of electrodes 17, in this case diametrically spaced across the entrance 12 of zone 10. These sets of electrodes are suitably energized through a phasing network by a radio-frequency source generally designated 19 (FIGURE 3) at frequencies approximating the cyclotron frequencies of the particles.

The cyclotron frequency may be defined as that rate with which the particles will traverse circular orbits in a uniform magnetic field if no perturbing forces were present. Its numerical value may be expressed as the product of the charge-to-mass ratio of the particle and the magnetic field strength in appropriate units. In particular, $$2\pi f = \frac{eH}{m}$$

where $f$ is the cyclotron frequency in cycles per second
$e/m$ is the charge-to-mass ratio of the particle in e.s.u.
$H$ is the magnetic field strength in e.s.u.

For example, if $e/m$ is $1.5 \times 10^{14}$ e.s.u./gm. for deuterons and $H$ is 10,000 gauss, then the cyclotron frequency will be 8 megacycles.

Figure 4:
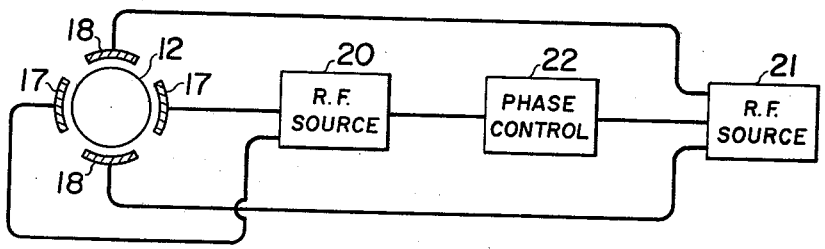
FIGURE 4 is a transverse sectional view taken substantially on line IV—IV of the arrangement of FIGURE 2 showing a typical RF electrode array.

To further enhance this rotation throughout at least a part of the magnetic gradient between the largest diameter of zone 10 and the restricted end portions thereof, an additional set of electrodes 18 is provided which may be designated rotation-enhancing electrodes. These are phased properly with respect to electrodes 17 previously mentioned and are energized from appropriate radio-frequency sources 20 nd 21 through phase control means generally designated 22. Although electrodes 17 and 18 are illustrated generally in FIGURE 4 as being in quadrature, this is merely for purpose of illustration, and they need not necessarily be related in that fashion.

From the foregoing, it will be apparent that means have been provided for the practice of this invention to introduce and to facilitate the reflection of charged particles within a zone where the neutron-generating reaction may occur.

An essential feature of the uniform magnetic field which surrounds the major portion of zone 10 to confine the paths of the particles traversing that zone is maintenance of a minimum value of that field. Expressed mathematically:

$$\frac{H_0^2}{8\pi} \geq 2nKT$$

where $H_0$ is the value of the magnetic field,
$n$ is the density of the particles per unit volume,
$K$ is the Boltzmann constant, and
$T$ is the temperature, all in consistent units.

It is desirable to keep $H_0$ at a low value so that the frequency of the transverse electrical fields may also be kept low. However, to obtain confinement of the particles within zone 10, the stored energy of the magnetic field must be equal to or greater than twice the stored kinetic energy of the particles in the zone.

The ratio between the magnetic field strengths in the particle-reflecting portions of the field at the ends of zone 10 to the strength in the uniform field portion of the zone ($H_0$) should preferably be about three. For example, for a deuteron and triton particle density of between $2 \times 10^{12}$ to $2 \times 10^{14}$ particles per cubic centimeter each, the minimum value of $H_0$ should be 6,300 gauss, making the minimum value of H about 19,000 gauss.

Figure 2:
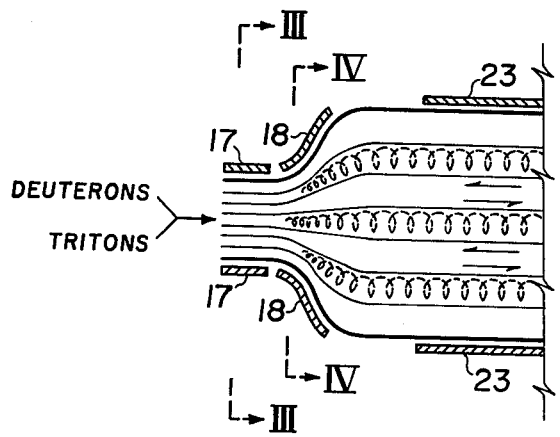
FIGURE 2 is a diagrammatic longitudinal sectional view of one end of the system shown in FIGURE 1, with an alternative arrangement for imposing an additional rotation-enhancing electrical field on the central portion of the reaction zone.

In the operation of this invention, a given particle may have its $E_r/E_z$ ratio greater than about .5, so that $H_0$, the uniform magnetic field of zone 10, is adequate for confinement during the traverse of that zone by the particle. If the $E_r/E_z$ ratio falls below about .5, plates 18 of the rotation-enhancing transverse electrical field will increase that ratio as outlined above so that the magnetic field gradient within the reflection zones at the ends of reaction zone 10 will be effective to return that particle along its helical path for its ultimate collision and fusion with another reactive charged particle. Under some circumstances sufficient losses may take place within the uniform section of zone 10, particularly if that zone is quite long, to bring the $E_r/E_z$ ratio below its critical value. In these cases a supplemental transverse electrical field may be imposed across zone 10 at an intermediate point; for example, by means of an opposed set of electrodes 23 (FIGURE 2). This would be appropriately driven by a radio-frequency source (not shown) and suitably phased with respect to the driving means for electrode sets 17 and 18 at the ends of the zone.

The net result is the production of a confined body of deutrons, tritons and neutralizing electrons which will react with the release of high energy neutrons. The neutrons will escape through the vessel wall and the magnetic windings surrounding the zone and may be utilized for any desired purpose.

Thus, there has been provided around the reaction zone 10 an elongated magnetic field to produce what may be characterized as a longitudinally variable, or, more specifically, an axially symmetrical, terminally concentrated magnetic field. The more intense magnetic field mirrors or reflectors cooperate with the transverse electric fields not only to permit the reacting particles of deuterons, tritons and electrons to be introduced into the system comprising evacuated zone 10, but also to impart to those particles a controlled helical motion which confines their paths within the zone and causes them to be reflected between the ends of the zone until sufficient nuclear events occur to produce the high energy neutrons which are the object of this invention.

Figure 5:
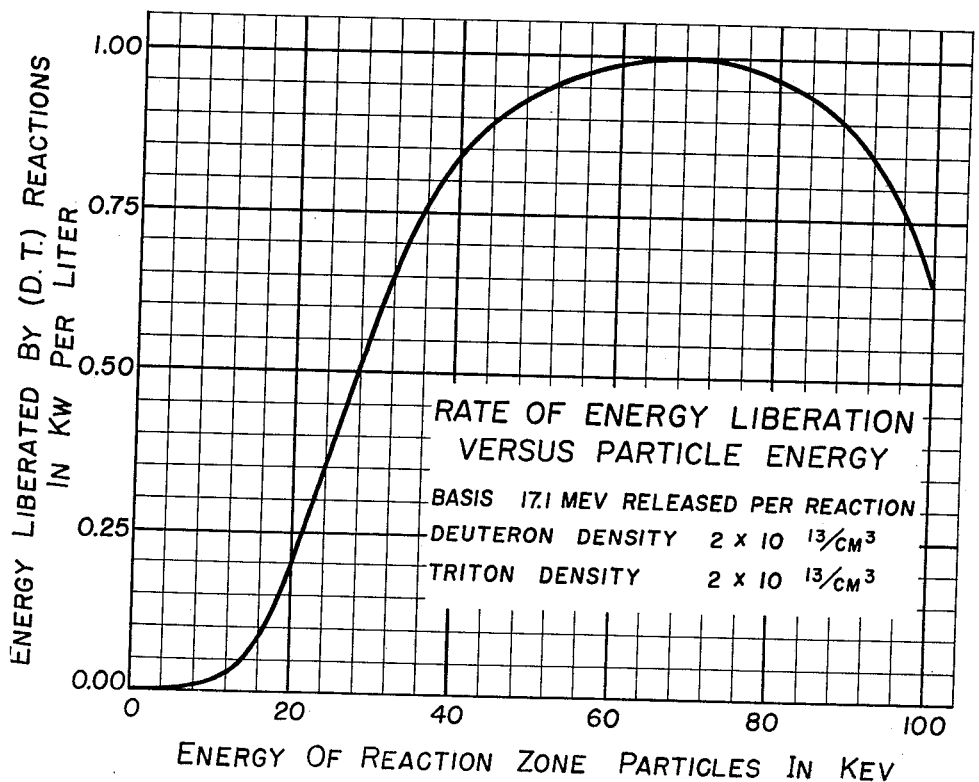
FIGURE 5 is a chart comparing the rate of energy liberation of a deuteron triton fusion reaction with the energy of reaction zone particles based on the introduction of monoenergetic particles.

Referring now to FIGURE 5, a comparison is there shown between the rate of energy liberation from zone 10 and the reaction zone particles for various energy levels of the latter. From this curve it is apparent that a desirable range for the introduction and subsequent maintenance of energy of the deuterons, tritons and preferably also the electrons, lies between about 40 and 100 kev. The advantages of operating within this range will be further apparent from the following specific example of a system which has been generally described above. In this illustrative example, zone 10 would have a straight cylindrical portion about two meters in diameter and about ten meters long with a uniform magnetic field of about 15,000 gauss, increasing at the ends 12 and 13 to about three times that field strength. Deuterons and tritons at about 20–60 kev. would be introduced through end 12 at a rate to maintain a particle density of about $2 \times 10^{13}/cm.^3$ in the reaction zone, and an appropriate flux of electrons at about the same energy would be injected into end 13 of zone 10. The derivation for the curve of FIGURE 5 is given below:

The (D, T) thermonuclear reaction rate for monoenergetic particles can be estimated for such a cylindrical velocity distribution as follows:

$$N = \frac{n_d n_t}{\pi} \int_0^\pi \sigma(E_r) v_r d\theta$$

where

N is the reaction rate in number per cm.³ per sec.
$n_d$, $n_t$ is the number of deuterons and tritons per cm.³
$\sigma(E_r)$ is the (D, T) cross section as a function of the relative energy.
$v_r$ is the relative velocity of the two particles.
$d\theta$ = angular distribution of velocity vector.

This reaction rate as a function of injected particle energy is plotted in FIGURE 5. It can be seen that the maximum reaction rate occurs at an incident particle energy of approximately 60–70 kev. This does not necessarily represent the optimum injection energy, however, since the energy that would represent the maximum actual yield per unit of energy input to the system would be more pertinent. However, since the energy dependence of the various system losses as well as the actual relaxed energy distribution of the incident particles is not known, a value of 60 kev. injection energy may be assumed.

An interesting aspect when the injection of the reactant particles is accomplished at energies upwards of 60 kev. lies in the control characteristics of such a system. It can be seen from FIGURE 5 that if the temperature of the system did increase suddenly from accumulation of energy within the system, the reaction rate would decrease, thus yielding a negative temperature coefficient. In contrast, thermonuclear proposals to date rely on much lower operating energies, and at these temperatures the reaction rate increases rapidly with increasing temperature. Such a situation for "controlled" thermonuclear systems may present serious control and hazard difficulties.

From the foregoing description and the accompanying illustrations, it will be apparent that the several objectives of the invention have been attained; namely, to provide a method of driving a neutron-producing reaction instead of depending upon the uncertainties of a controlled reaction to provide methods for controlling the paths of reacting particles of deuterium and tritium in a magnetically confined reaction zone in the presence of neutralizing electrons, and to provide alternative arrangements for carrying out the methods of the invention which will produce an intense flux of high energy neutrons. The configuration of the zone need not be a simple cylinder, as shown, but could be in the form of a closed loop or toroid, with appropriate magnetic windings to give localized magnetic field gradients which would cooperate with transverse oscillating electrical fields to cause the multiple reflections of particles to confine their paths within said zone.

Although the foregoing description has dealt with deuteron triton neutron particle-generating reactions, it will be apparent that fusion or other particle-producing reactions such as deuteron-deuteron, with neutralizing electrons, could be utilized without departing from this invention. Accordingly, any such modifications and changes that come within the scope of the appended claims are intended to be embraced thereby.

We claim:

1. In a method of driving a neutron producing reaction in which reactive charged particles comprising deuterons and tritons are injected into one end of a confined zone within a magnetic field having spatially opposed magnetic mirrors, said confined zone containing deuterons and tritons at a particle density in the order of from $2 \times 10^{12}$ to $2 \times 10^{14}$ per cubic centimeter each, said particles being at from about 40 kev. to about 100 kev., the step of imparting rotational energy to said particles by imposing a transverse oscillating electric field on said particles at said magnetic mirrors to bring the ratio of rotational to translational energy of said particles to at least about 0.5.

2. A method of controlling a neutron producing reaction by introducing reactive charged particles of deuterons and tritons and neutralizing electrons into a confined zone within a magnetic field having longitudinally spaced localized gradients of increasing flux density constituting spatially opposed magnetic reflectors for said charged particles and imparting an increase of rotational energy to said particles at said gradients by imposing an oscillating transverse electrical field across said gradients at substantially the cyclotron frequency of each of said reactive particles to confine the paths of said particles in said zone and bringing the particle density of said deuterons and tritons to the order of at least about $2 \times 10^{12}$ and to an energy level of not less than about 40 kev. until high energy neutrons are produced.

3. A method according to claim 2, with the addition of the step of maintaining the rotational energy of said particles between said localized magnetic particle reflector flux gradients by imposing an oscillating transverse electrical field thereon to confine the paths of said particles in said zone.

4. A method of controlling a neutron producing reaction by introducing reactive charged particles comprising deuterons, tritons and neutralizing electrons into a confined zone within a magnetic field having longitudinally spaced magnetic reflectors for said charged particles, said reflectors comprising localized gradients of increased flux density, and imparting a net increase of rotational energy to said particles by imposing successive oscillating transverse electrical fields thereon with at least one of said successive fields being applied across said gradients to confine their paths within said zone along the magnetic lines of force in said confined zone.

5. A method according to claim 4, in which said particles are introduced at a rate which is effective to maintain a particle density in said confined zone between about $2 \times 10^{12}$ to $2 \times 10^{14}$ particles per cubic centimeter.

6. A method according to claim 4, in which the $Er/Ez$ ratio of said particles is maintained at or above about 0.5 substantially throughout said zone.

7. A method according to claim 4, in which said magnetic field varies longitudinally between about 6,000 to about 20,000 gauss.

References Cited in the file of this patent

UNITED STATES PATENTS

| | | |
|---|---|---|
| 1,948,384 | Lawrence | Feb. 20, 1934 |
| 2,735,019 | Dewan et al. | Feb. 14, 1956 |
| 2,910,414 | Spitzer | Oct. 27, 1959 |

FOREIGN PATENTS

| | | |
|---|---|---|
| 637,866 | Great Britain | May 31, 1950 |
| 656,398 | Great Britain | Aug. 22, 1951 |
| 706,036 | Great Britain | Mar. 24, 1954 |

OTHER REFERENCES

Journal of Scientific Instruments, vol. 16, February 1939, pages 1337–1344.

Proceedings of the Royal Society of London, A 204 (1950), pages 488–495.

Pocket Encyclopedia of Atomic Energy by Frank Gaynor, Philosophical Library, New York 1950, pages 74–76.

Physical Review 88 (1952), pages 468–473.

Nuclear Radiation Physics by R. E. Lapp and H. L. Andrews, 2nd edition, 1954, Prentice-Hall, New York, pages 303–307.

Physical Review, vol. 93, Ser. 2, January-March 1954, pages 1337–1344.

Nucleonics, February 1956, pp. 42–44.

Nucleonics, June 1956, pp. 36–43, 123.

Reviews of Modern Physics, vol. 28, No. 3, July 1956, R. F. Post, pp. 338, 339, 340, 359, 360.

Atomic Industry Reporter News and Analysis, Official Text Section 1958, Library No. TK 9001 A7, issue of Jan. 29, 1958, pages 54:5–54:11.

Project Sherwood, by Amasa S. Bishop, Addison-Wesley Publishing So., Reading, Mass., 1958, page 167.